(12) United States Patent
Bonk

(10) Patent No.: US 11,312,273 B1
(45) Date of Patent: Apr. 26, 2022

(54) METHOD AND APPARATUS FOR MAT RETENTION IN A SEAT ASSEMBLY

(71) Applicant: FAURECIA AUTOMOTIVE SEATING, LLC, Auburn Hills, MI (US)

(72) Inventor: Jeffery Bonk, Chesterfield, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/212,044

(22) Filed: Mar. 25, 2021

(51) Int. Cl.
*A47C 7/02* (2006.01)
*A47C 7/62* (2006.01)
*B60N 2/58* (2006.01)
*B60N 2/00* (2006.01)
*B60N 2/56* (2006.01)

(52) U.S. Cl.
CPC ........... *B60N 2/5825* (2013.01); *B60N 2/002* (2013.01); *B60N 2/5685* (2013.01)

(58) Field of Classification Search
CPC .. B60N 2/5825; B60N 2/5635; B60N 2/5685; B60N 2/58; B60N 2/5841
See application file for complete search history.

(56) References Cited

U.S. PATENT DOCUMENTS

| | | | |
|---|---|---|---|
| 4,695,091 A | 9/1987 | Altmann et al. | |
| 6,817,675 B2 | 11/2004 | Buss et al. | |
| 6,893,086 B2 * | 5/2005 | Bajic | B60N 2/5657 297/180.14 |
| 6,899,399 B2 | 5/2005 | Ali et al. | |
| 7,052,091 B2 * | 5/2006 | Bajic | B60N 2/5642 297/452.43 |
| 8,507,831 B2 * | 8/2013 | Howick | B60N 2/5685 219/210 |
| 8,544,942 B2 * | 10/2013 | Lazanja | H05B 1/028 297/180.12 |
| 8,702,164 B2 * | 4/2014 | Lazanja | H01C 17/06 297/180.12 |
| 8,814,262 B2 | 8/2014 | Abe et al. | |

(Continued)

FOREIGN PATENT DOCUMENTS

DE 10158596 C1 2/2003

*Primary Examiner* — Shin H Kim
(74) *Attorney, Agent, or Firm* — Carlson, Gaskey & Olds, P.C.

(57) ABSTRACT

A method and an apparatus, according to an exemplary aspect of the present disclosure includes, among other things, a seat pad including at least one trench, a plurality of discrete fasteners positioned within the at least one trench, and a mat placed on the seat pad. The mat comprises a main portion that includes an electrical element and at least one extension panel extending outwardly from an outer edge of the main portion and being devoid of the electrical element. The at least one extension panel includes fastener openings with each fastener opening being aligned with one fastener of the plurality of discrete fasteners when the at least one extension panel is tucked into the at least one trench. A seat cover has an inner surface that faces the mat and includes an attachment feature that is aligned with the fastener openings. The attachment feature extends through the fastener openings and engages the plurality of discrete fasteners to secure the mat between the seat pad and the seat cover.

15 Claims, 3 Drawing Sheets

(56) References Cited

U.S. PATENT DOCUMENTS

| | | | |
|---|---|---|---|
| 10,065,543 B2 * | 9/2018 | Persson | B60N 2/5657 |
| 2004/0100131 A1 * | 5/2004 | Howick | B60N 2/002 |
| | | | 297/180.12 |
| 2005/0150090 A1 * | 7/2005 | Pedde | F16B 5/0692 |
| | | | 24/698.1 |
| 2005/0242081 A1 * | 11/2005 | Howick | B60N 2/5685 |
| | | | 219/529 |
| 2006/0038432 A1 | 2/2006 | Koehler | |
| 2009/0064471 A1 * | 3/2009 | Santin | B60N 2/5825 |
| | | | 24/581.11 |
| 2011/0226751 A1 * | 9/2011 | Lazanja | H01C 17/06 |
| | | | 219/217 |
| 2012/0228903 A1 * | 9/2012 | Abe | B60N 2/5825 |
| | | | 297/180.12 |
| 2017/0096088 A1 * | 4/2017 | Persson | B60N 2/5685 |
| 2020/0247292 A1 | 8/2020 | Onuma et al. | |

\* cited by examiner

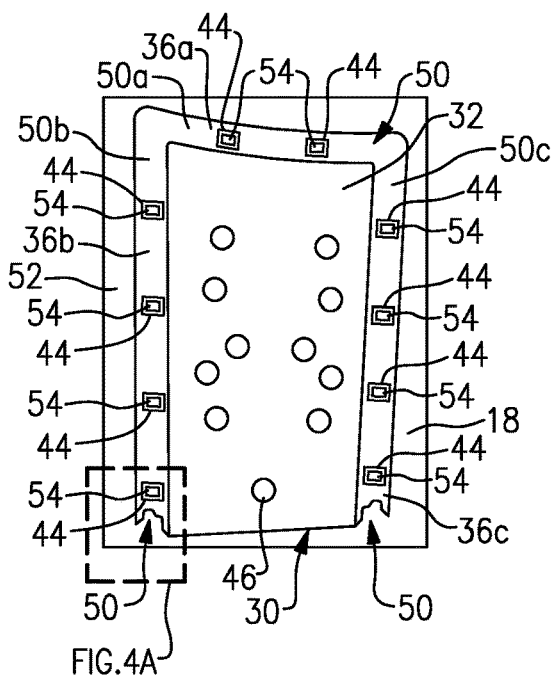
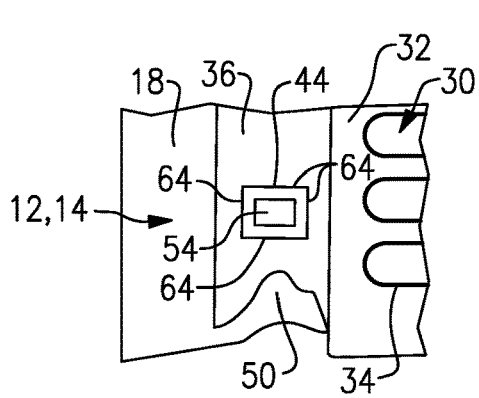
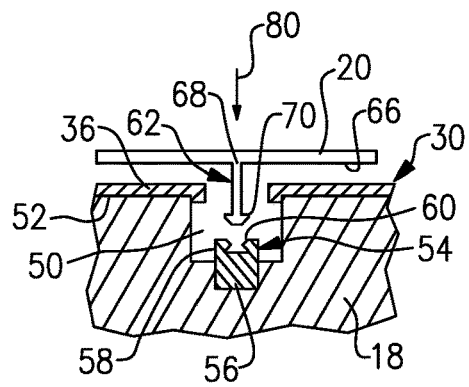
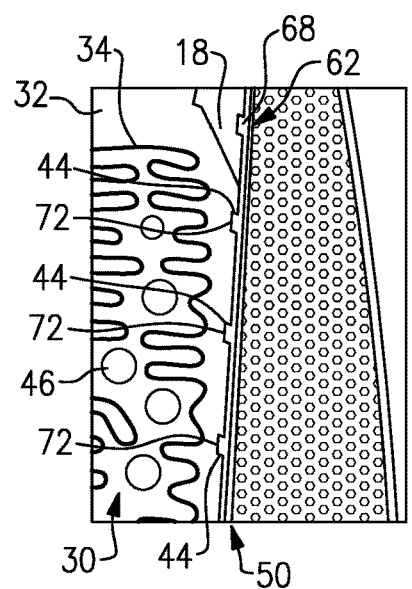

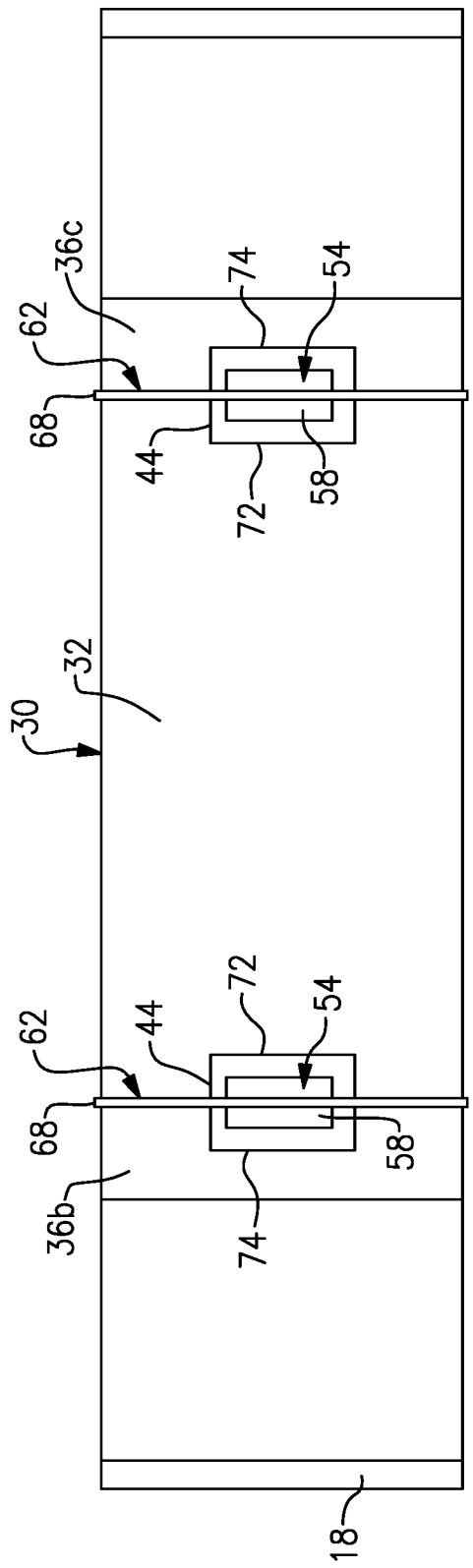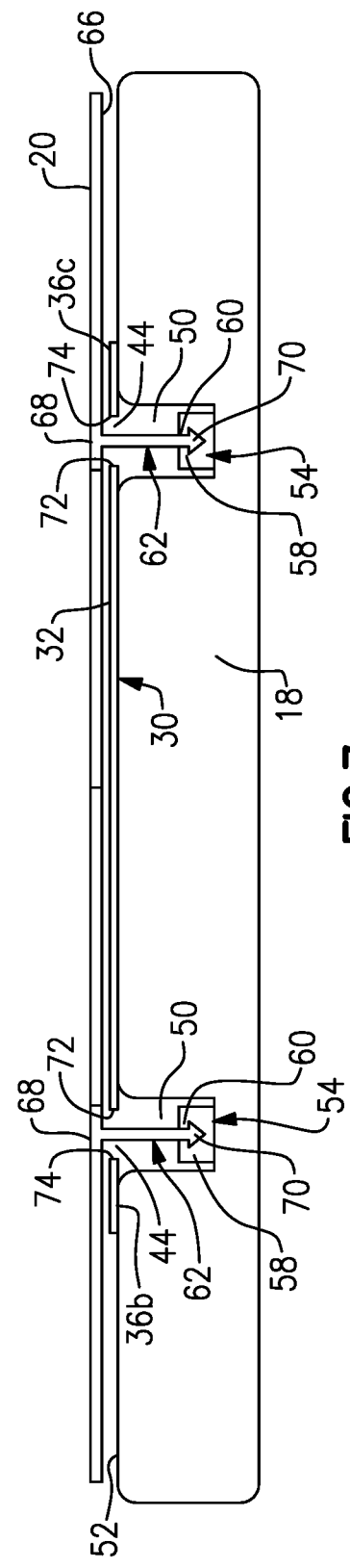

METHOD AND APPARATUS FOR MAT RETENTION IN A SEAT ASSEMBLY

TECHNICAL FIELD

This disclosure relates generally to a vehicle seat assembly that includes a mat that is attached to a seat pad.

BACKGROUND

A vehicle seat assembly can include a mat that is attached to a seat pad with adhesive. A seat trim cover is then placed over the mat and secured to the seat pad. Using adhesive to attach the mat can be time consuming and expensive.

SUMMARY

An apparatus according to an exemplary aspect of the present disclosure includes, among other things, a seat pad including at least one trench, a plurality of discrete fasteners positioned within the at least one trench, and a mat placed on the seat pad. The mat comprises a main portion that includes an electrical element and at least one extension panel extending outwardly from an outer edge of the main portion and being devoid of the electrical element. The at least one extension panel includes fastener openings with each fastener opening being aligned with one fastener of the plurality of discrete fasteners when the at least one extension panel is tucked into the at least one trench. A seat cover has an inner surface that faces the mat and includes an attachment feature that is aligned with the fastener openings. The attachment feature extends through the fastener openings and engages the plurality of discrete fasteners to secure the mat between the seat pad and the seat cover.

In a further non-limiting embodiment of the foregoing apparatus, the mat comprises a heater mat or a sensor mat.

In a further non-limiting embodiment of any of the foregoing apparatus, the seat pad is comprised of a foam material, and wherein the plurality of discrete fasteners each have a first portion embedded within the foam material and a second portion that is exposed within the at least one trench.

In a further non-limiting embodiment of any of the foregoing apparatus, the second portions of the plurality of discrete fasteners are spaced from edges of the fastener openings such that the mat is not positively retained to the plurality of discrete fasteners.

In a further non-limiting embodiment of any of the foregoing apparatus, each fastener opening includes a first edge adjacent the main portion and a second edge opposite the first edge, and wherein the first edges of the fastener openings are placed along an edge of the trench to align the mat relative to the seat pad.

In a further non-limiting embodiment of any of the foregoing apparatus, the main portion includes a first edge, a second edge opposite of the first edge, and first and second side edges connecting the first and second edges, and wherein the at least one extension panel comprises at least a first extension panel extending outwardly from one of the first and second edges, a second extension panel extending outwardly from the first side edge, and a third extension panel extending outwardly from the second side edge; each of the first, second, and third extension panels include the fastener openings which comprise discrete windows spaced apart from each other along a length of a respective one of the first, second, and third extension panels; the at least one trench comprises at least a first trench into which the first extension panel is tucked, a second trench into which the second extension panel is tucked, and a third trench into which the third extension panel is tucked; and each of the first, second, and third trenches include discrete fasteners from the plurality of discrete fasteners, wherein each discrete fastener is aligned with one of the discrete windows.

In a further non-limiting embodiment of any of the foregoing apparatus, the mat is attached to the seat pad without the use of adhesive.

In a further non-limiting embodiment of any of the foregoing apparatus, the plurality of discrete fasteners comprise a plurality of clips, and wherein the attachment features comprises an attachment strip fixed to the seat cover.

In a further non-limiting embodiment of any of the foregoing apparatus, a vehicle seat assembly is configured to support an occupant and has a seat cushion coupled to a seat back, and wherein an assembly of the seat pad, the mat, and the seat cover comprises at least one of the seat cushion and the seat back.

A method according to still another exemplary aspect of the present disclosure includes, among other things: forming at least one trench in a seat pad; positioning a plurality of discrete fasteners within the at least one trench; placing a mat on the seat pad, wherein the mat comprises a main portion that includes an electrical element and at least one extension panel extending outwardly from an outer edge of the main portion and being devoid of the electrical element, and wherein the at least one extension panel includes fastener openings; tucking the at least one extension panel into the at least one trench with each fastener opening being aligned with one fastener of the plurality of discrete fasteners; fixing an attachment feature to an inner surface of a seat cover that faces the mat; aligning the attachment feature with the fastener openings; and extending the attachment feature through the fastener openings to engage the plurality of discrete fasteners to secure the mat between the seat pad and the seat cover.

In a further non-limiting embodiment of the foregoing method, the method includes molding the plurality of discrete fasteners within the seat pad such that each fastener has a first portion embedded within the seat pad and a second portion that is exposed within the at least one trench to be viewable within a respective fastener opening.

In a further non-limiting embodiment of any of the foregoing methods, each fastener opening includes a first edge adjacent the main portion and a second edge opposite the first edge, and wherein the method further includes placing the first edges of the fastener openings along an edge of the trench to align the mat relative to the seat pad.

In a further non-limiting embodiment of any of the foregoing methods: the main portion includes a first edge, a second edge opposite of the first edge, and first and second side edges connecting the first and second edges, and wherein the at least one extension panel comprises at least a first extension panel extending outwardly from one of the first and second edges, a second extension panel extending outwardly from the first side edge, and a third extension panel extending outwardly from the second side edge; each of the first, second, and third extension panels include the fastener openings which comprise discrete windows spaced apart from each other along a length of a respective one of the first, second, and third extension panels; the at least one trench comprises at least a first trench, a second trench, and a third trench, wherein each of the first, second, and third trenches include discrete fasteners from the plurality of discrete fasteners; and the method further includes tucking the first extension panel into the first trench to align each discrete fastener with one of the discrete windows, tucking the second extension panel into the second trench to align each discrete fastener with one of the discrete windows, and tucking the third extension panel into the third trench to align each discrete fastener with one of the discrete windows.

In a further non-limiting embodiment of any of the foregoing methods, the mat comprises a heater mat or a sensor mat, and wherein the method further includes spacing the plurality of discrete fasteners from edges of the fastener openings such that the heater or the sensor mat is not positively retained to the plurality of discrete fasteners.

In a further non-limiting embodiment of any of the foregoing methods, the method includes attaching the mat to the seat pad without the use of adhesive.

The present disclosure may include any one or more of the individual features disclosed above and/or below alone or in any combination thereof. The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 is a front view of the mat of FIG. 2 tucked into trenches of a seat pad of the seat assembly with openings of the mat being aligned with fasteners in the seat pad;

FIG. 4A is an enlarged portion of the mat and seat as identified in FIG. 3;

FIG. 4B is a schematic section view of a fastener, the mat, and the seat pad of FIG. 4A;

FIG. 5 is a front view of an attachment feature of a seat cover attached to the fasteners;

FIG. 6 is a schematic top view of seat pad and mat with the attachment feature; and FIG. 7 is a schematic section view of FIG. 6 as identified in FIG. 1.

DETAILED DESCRIPTION

This disclosure details an exemplary vehicle seat assembly with a mat that is attached to a seat pad that includes a plurality of discrete fasteners located within a trench formed in the seat pad, and wherein the mat includes extension panels with fastener openings that are aligned with the fasteners such that an attachment feature associated with a seat cover can cooperate with the fasteners to secure the mat between the seat pad and the seat cover.

Figure 1:
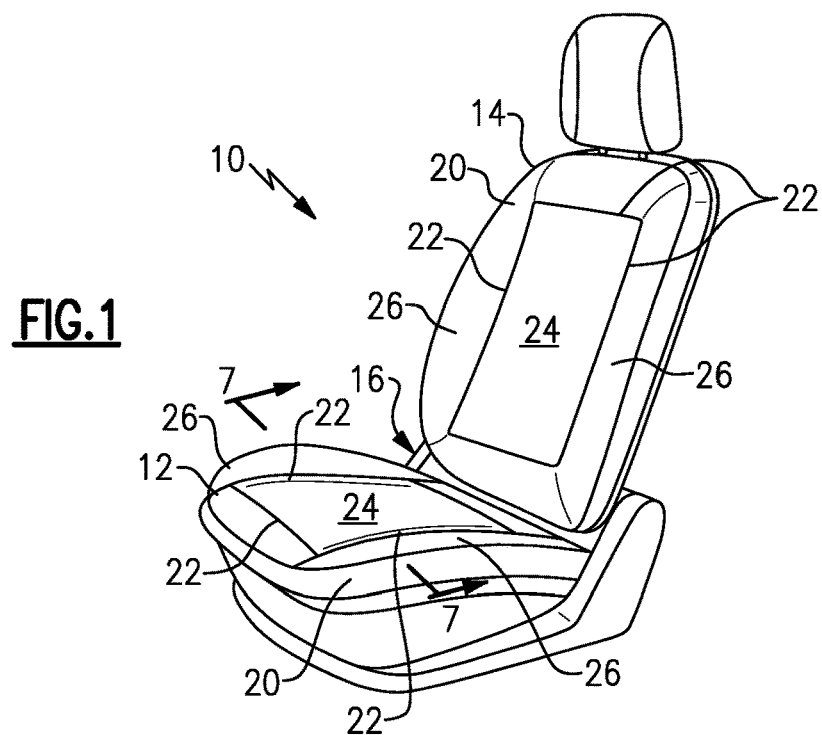
FIG. 1 is a perspective view of a vehicle seat assembly.

FIG. 1 shows a vehicle seat assembly 10 that is configured to support an occupant. The seat assembly 10 includes a seat cushion 12 coupled to a seat back 14 at a seat biteline area 16 where the seat cushion 12 and seat back 14 meet. In one example, the seat back 14 includes a seat pad 18 (FIG. 3) that is covered by a seat outer trim cover 20 to provide an aesthetically pleasing appearance. The seat back 14 includes trench locations 22 that separate a main insert seat area 24 from wing or bolster seat areas 26. The trench locations 22 receive trim tie-down strips that facilitate attachment of the outer trim cover 20 to the seat pad 18. The seat cushion 12 can be similarly configured.

The seat assembly 10 includes a mat 30 (FIG. 2) that is secured between the seat pad 18 and the seat cover 20. The mat 30 is placed on an outwardly facing surface of the seat pad 18. The mat 30 includes a main portion 32 having an electrical element 34 and one or more extension panels 36. The extension panels 36 extend outwardly from outer edges 38 of the main portion 32 and are devoid of the electrical element 34. The mat 30 can comprise a heater mat or a sensor mat, for example. For a heater mat, the electrical element 34 can comprise a conductive wire that generates heat when energized by a power source 40. For a sensor mat, the electrical element 34 can comprise sensors that are used to sense weight, temperature, etc. In the example shown in FIG. 2, the mat 30 comprises a heater mat. A controller 42 can be connected to the power source 40.

Figure 2:
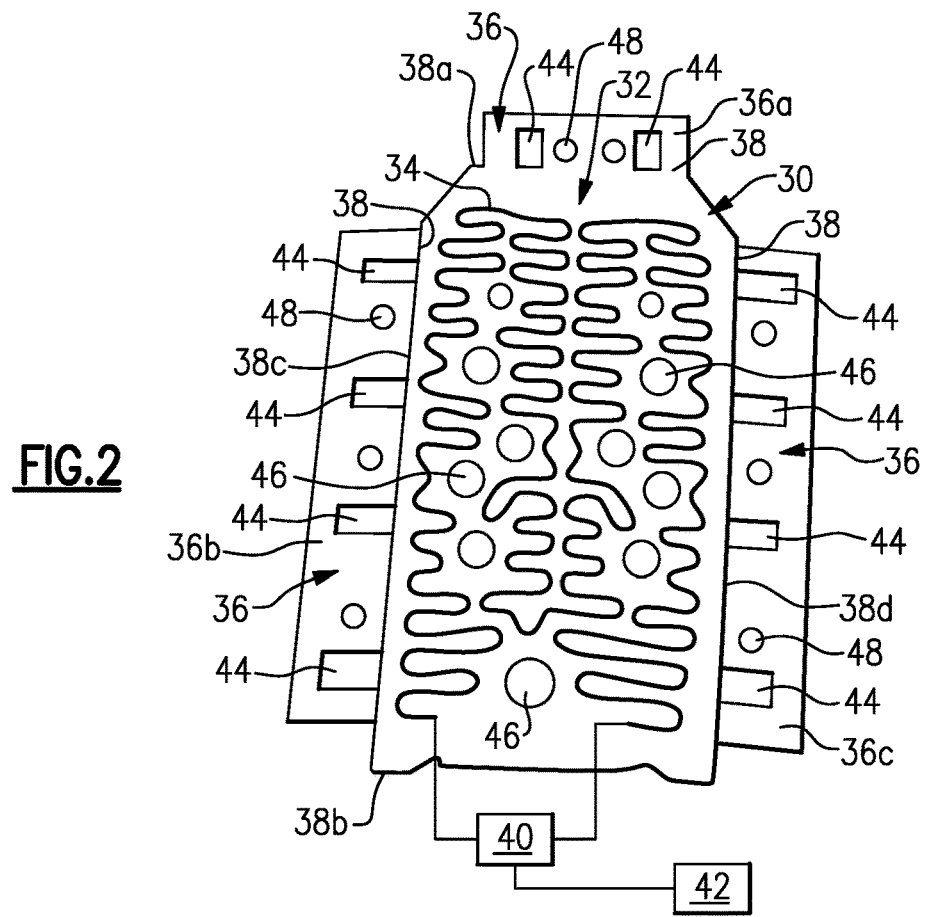
FIG. 2 is a top view of a mat to be installed in the vehicle seat assembly of FIG. 1.

As shown in FIG. 2, the extension panels 36 include fastener openings 44. In this example, the main portion 32 of the mat 30 includes a first edge 38a, a second edge 38b opposite of the first edge 38a, and opposing first 38c and second 38d side edges connecting the first 38a and second 38b edges. A first extension panel 36a extends outwardly from the first edge 38a, a second extension panel 36b extends outwardly from the first side edge 38c, and a third extension panel 36c extends outwardly from the second side edge 38d. An extension panel could also extend outwardly from the second edge 38b. Each of the first, second, and third extension panels, 36a, 36b, and 36c, respectively include the fastener openings 44. In one example, the fastener openings 44 comprise discrete windows that are spaced apart from each other along a length of a corresponding one of the extension panels, 36a, 36b, and 36c, respectively.

In one example, the main portion 32 includes a plurality of airflow openings 46 that help circulate air throughout the seat assembly 10. The airflow openings 46 are discrete openings that are spaced apart from each other across the length and width of the main portion 32. The electrical element 34 comprising the conductive wire is placed around the airflow openings 46, and is dispersed across the length and width of the main portion 32 to evenly distribute heat across the entire seat pad 18. One or more of the extension panels 36 can also include additional openings 48 that receive rods (not shown) as part of a fixture for assembling the seat pad 18 and mat 30 together. As shown, each electrical element 34 is positioned inward with respect to the extension panels 36 such that the extension panels 36 form the outermost portions of the mat 30 and are devoid of any electrical element 34.

In one example, the mat 30 is made of a felt or other suitable material and houses the electrical element 34 within, or on, the main portion 32 of the mat 30. The main portion 32 has an area that is defined by a length and a width, and which covers a significant portion of the seat pad 18. Each of the extension panels 36 have an area that is defined by a length and a width. The area of the main portion 32 is significantly larger than the area of each of the extension panels 36.

In one example, the seat pad 18 is comprised of a foam material to provide cushioning support for an occupant seated on the seat assembly 10. As shown in FIG. 3, the seat pad 18 includes one or more trenches 50 that comprise generally linear openings or slits that extend into the seat pad 18. Each trench 50 has a bottom surface and opposing side edges that extend to an outer surface 52 of the seat pad 18

(FIG. 7). The trenches 50 have side walls that extend from the bottom surface to the outer surface 52. A plurality of discrete fasteners 54 are positioned within the trench 50. The fasteners 54 are spaced apart from each other along a length of each of the trenches 50. In one example, the plurality of discrete fasteners 54 each have a first portion 56 embedded within the foam material and a second portion 58 that is exposed within the trench 50 as shown in FIG. 4B. The second portion 58 is visible within the trench 50 and includes a gripping or clamping portion 60 that engages an attachment feature 62 (FIG. 5) on the trim cover 20. In one example, the fasteners 54 comprise clips having a rigid base and a resilient gripping portion. Other fasteners such as Velcro, hog rings, pins, etc. could also be used.

As discussed above, the mat 30 includes a plurality of extension panels 36 that include discrete fastener openings 44. Each extension panel 36 is tucked into a respective trench 50 as shown in FIG. 3. In one example, the first extension panel 36a is tucked into a first trench 50a, the second extension panel 36b is tucked into a second trench 50b, and the third extension panel 36c is tucked into a third trench 50c. Each of the first 50a, second 50b, and third 50c trenches include fasteners 54 as described above.

Each fastener opening 44 is aligned with one fastener 54 when the extension panels 36 are tucked into trenches 50 as shown in FIG. 3. This allows the second portions 58 of the fasteners 54 to be visible through the window openings 44 as shown in FIG. 4A. In one example, the second portions 58 of the fasteners 54 are spaced from edges 64 (FIG. 4A) of the fastener openings 44 such that the mat 30 is not positively retained to the fasteners 54 themselves.

The seat trim cover 20 has an inner surface 66 (FIG. 4B) that faces the mat 30 and includes the attachment feature 62 that is aligned with the fastener openings 44 and the fasteners 54. To secure the mat 30 to the seat pad 18, the attachment feature 62 extends through the fastener openings 44 and engages the plurality of discrete fasteners 54 to secure the mat 30 between the seat pad 18 and the seat trim cover 20. In one example shown in FIG. 5, the attachment feature 62 comprises a trim attachment strip 68 that snaps into the clips/fasteners 54 located in the trench 50, which traps the mat 30 between the pad 18 and the cover 20. In one example, the trim attachment strip 68 is sewn or otherwise attached to the trim cover 20 to extend along a length of the trenches 50. The trim attachment strip 68 includes a gripping portion 70 that cooperates with the gripping portion 60 of the fasteners 54 to provide a connection interface. Thus, the mat 30 is securely attached to the seat pad 18 without the use of adhesive.

In one example, the connection interface comprises a male/female connection with the gripping portion 60 of the fastener 54 including an opening that receives the gripping portion 70 of the strip 68. The reverse connection could also be used where the gripping portion 60 of the fastener 54 extends into an opening in the gripping portion 70 of the strip 68.

In one example, each fastener opening 44 includes a first edge 72 adjacent the main portion 32 of the mat 30 and a second edge 74 opposite the first edge 72 (FIGS. 6-7). The first edges 72 of the fastener openings 44 extend along an edge of the trench 50 to align the mat 30 relative to the seat pad 18 as shown in FIG. 5. This allows the openings 44 in the mat 30 to be easily aligned with the fasteners 54. Further, the mat 30 can easily be re-positioned as needed. This is advantageous over prior configurations that utilized adhesive. The mat 30 of the subject disclosure can be easily repositioned by simply adjusting a position of the mat 30 on the surface 52 of the pad 18 to align the edges 72 of the openings 44 along the trench 50.

A method of retaining a mat 30 within a seat assembly 10 is also disclosed. The method includes forming at least one trench 50 in a seat pad 18 and positioning a plurality of discrete fasteners 54 within the trench 50. Additional steps include placing a mat 30 on the seat pad 18 and tucking the extension panel 36, which is devoid of any electrical element 34, into the trench 50 such that each fastener opening 44 is aligned with one fastener 54. The method further includes fixing an attachment feature 62 to an inner surface 66 of a seat trim cover 20 that faces the mat 30, aligning the attachment feature 62 with the fastener openings 44, and extending the attachment feature 62 through the fastener openings 44 to engage the fasteners 54 to securely hold the mat 30 between the seat pad 18 and the seat trim cover 20.

In one example, the plurality of discrete fasteners 54 are molded within the seat pad 18 such that each fastener 54 has a first portion 56 embedded within the seat pad and a second portion 58 that is exposed within trench 50 to be viewable within a respective fastener opening 44 as shown in FIG. 6. The fastener openings 44 comprise discrete windows that are spaced apart from each other along a length of a respective one of the first 36a, second, and third extension panels, 36a, 36b, and 36c, respectively (FIG. 3). Each fastener opening 44 has a first edge 72 adjacent the main portion 32, and the first edges 72 of the fastener openings 44 are extended along the edge of the trench 50 to align the mat 30 relative to the seat pad 18. This alignment occurs for each of the first, second, and third extension panels, 36a, 36b, and 36c, respectively, with regard to the respective first trench 50a, a second trench 50b, and a third trench 50c.

After alignment, each extension panel 36 is tucked into the respective trench 50. In one example, the method includes tucking the first extension panel 36a into the first trench 50a to align each discrete fastener 54 with one of the discrete windows, tucking the second extension panel 36b into the second trench 50b to align each discrete fastener 54 with one of the discrete windows, and tucking the third extension panel 36c into the third trench 50c to align each discrete fastener 54 with one of the discrete windows. Next, corresponding attachment strips 68, which are fixed to the trim cover 20, are clipped or snapped into the fasteners 54 in each of the trenches 50 via a pressing movement 80 shown in FIG. 7.

In one example, the method further includes spacing the fasteners 54 from edges 64 of the fastener openings 44 such that the mat 30 is not positively retained to the fasteners 54.

The retainment of the mat 30 can be for the seat cushion 12 or the seat back 14. A mat 30 can also be retained within both the seat cushion 12 and the seat back 14. A retainment method and apparatus are disclosed that provide the sensor or heater mat 30 with outwardly extending panels 36 that are free from any electrical elements, and where the panels 36 have openings 44 that align with fasteners 54 within trenches 50 formed in the seat pad 18. An attachment feature 62 fixed to the trim cover 20 is clipped into the fasteners 54 to trap the mat 30 between the trim cover 20 and seat pad 18. This prevents the mats 30 from moving or sliding out of position over the lifetime of the seat assembly 10 as may occur in retention methods that use adhesive strips.

Repeated use over time can cause adhesive strips to detach from the foam material of the seat pad. Additionally, the foam material can dry out over time which can also cause adhesive strips to detach. Detachment of the adhesive strips can cause the mat 30 to slide toward the seat biteline area 16 and bunch up, which reduces the capability of the mat 30 to operate as intended. The subject disclosure provides for a mat 30 that is securely attached to the seat pad 18 without the use of adhesive. This reduces cost due to the elimination of the adhesive tape while also providing a more efficient and faster assembly method. Also, the scrap rate related to the use of adhesive is eliminated, which provides an additional cost savings.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a seat pad including at least one trench;
   a plurality of discrete fasteners positioned within the at least one trench;
   a mat placed on the seat pad and comprising a main portion that includes an electrical element and at least one extension panel extending outwardly from an outer edge of the main portion and being devoid of the electrical element, wherein the at least one extension panel includes fastener openings with each fastener opening being aligned with one fastener of the plurality of discrete fasteners when the at least one extension panel is tucked into the at least one trench; and
   a seat cover having an inner surface that faces the mat and includes an attachment feature that is aligned with the fastener openings, and wherein the attachment feature extends through the fastener openings and engages the plurality of discrete fasteners to secure the mat between the seat pad and the seat cover.

2. The apparatus according to claim 1, wherein the mat comprises a heater mat or a sensor mat.

3. The apparatus according to claim 1, wherein the seat pad is comprised of a foam material, and wherein the plurality of discrete fasteners each have a first portion embedded within the foam material and a second portion that is exposed within the at least one trench.

4. The apparatus according to claim 3, wherein the second portions of the plurality of discrete fasteners are spaced from edges of the fastener openings such that the mat is not positively retained to the plurality of discrete fasteners.

5. The apparatus according to claim 1, wherein each fastener opening includes a first edge adjacent the main portion and a second edge opposite the first edge, and wherein the first edges of the fastener openings are placed along an edge of the trench to align the mat relative to the seat pad.

6. The apparatus according to claim 1, wherein:
   the main portion includes a first edge, a second edge opposite of the first edge, and first and second side edges connecting the first and second edges, and wherein the at least one extension panel comprises at least a first extension panel extending outwardly from one of the first and second edges, a second extension panel extending outwardly from the first side edge, and a third extension panel extending outwardly from the second side edge;
   each of the first, second, and third extension panels include the fastener openings which comprise discrete windows spaced apart from each other along a length of a respective one of the first, second, and third extension panels;
   the at least one trench comprises at least a first trench into which the first extension panel is tucked, a second trench into which the second extension panel is tucked, and a third trench into which the third extension panel is tucked; and
   each of the first, second, and third trenches include discrete fasteners from the plurality of discrete fasteners, wherein each discrete fastener is aligned with one of the discrete windows.

7. The apparatus according to claim 1, wherein the mat is attached to the seat pad without the use of adhesive.

8. The apparatus according to claim 1, wherein the plurality of discrete fasteners comprise a plurality of clips, and wherein the attachment features comprises an attachment strip fixed to the seat cover.

9. The apparatus according to claim 1, including a vehicle seat assembly configured to support an occupant and having a seat cushion coupled to a seat back, and wherein an assembly of the seat pad, the mat, and the seat cover comprises at least one of the seat cushion and the seat back.

10. A method comprising:
    forming at least one trench in a seat pad;
    positioning a plurality of discrete fasteners within the at least one trench;
    placing a mat on the seat pad, wherein the mat comprises a main portion that includes an electrical element and at least one extension panel extending outwardly from an outer edge of the main portion and being devoid of the electrical element, and wherein the at least one extension panel includes fastener openings;
    tucking the at least one extension panel into the at least one trench with each fastener opening being aligned with one fastener of the plurality of discrete fasteners;
    fixing an attachment feature to an inner surface of a seat cover that faces the mat;
    aligning the attachment feature with the fastener openings; and
    extending the attachment feature through the fastener openings to engage the plurality of discrete fasteners to secure the mat between the seat pad and the seat cover.

11. The method according to claim 10, including molding the plurality of discrete fasteners within the seat pad such that each fastener has a first portion embedded within the seat pad and a second portion that is exposed within the at least one trench to be viewable within a respective fastener opening.

12. The method according to claim 10, wherein each fastener opening includes a first edge adjacent the main portion and a second edge opposite the first edge, and wherein the method further includes placing the first edges of the fastener openings along an edge of the trench to align the mat relative to the seat pad.

13. The method according to claim 10, wherein:
    the main portion includes a first edge, a second edge opposite of the first edge, and first and second side edges connecting the first and second edges, and wherein the at least one extension panel comprises at least a first extension panel extending outwardly from one of the first and second edges, a second extension panel extending outwardly from the first side edge, and a third extension panel extending outwardly from the second side edge;

each of the first, second, and third extension panels include the fastener openings which comprise discrete windows spaced apart from each other along a length of a respective one of the first, second, and third extension panels;

the at least one trench comprises at least a first trench, a second trench, and a third trench, wherein each of the first, second, and third trenches include discrete fasteners from the plurality of discrete fasteners; and the method further includes tucking the first extension panel into the first trench to align each discrete fastener with one of the discrete windows, tucking the second extension panel into the second trench to align each discrete fastener with one of the discrete windows, and tucking the third extension panel into the third trench to align each discrete fastener with one of the discrete windows.

14. The method according to claim 10, wherein the mat comprises a heater mat or a sensor mat, and wherein the method further includes spacing the plurality of discrete fasteners from edges of the fastener openings such that the heater or the sensor mat is not positively retained to the plurality of discrete fasteners.

15. The method according to claim 10, including attaching the mat to the seat pad without the use of adhesive.

* * * * *